United States Patent
Iijima

(10) Patent No.: US 9,900,413 B2
(45) Date of Patent: Feb. 20, 2018

(54) HOUSING OF ELECTRONIC DEVICE AND ELECTRONIC DEVICE

(71) Applicant: FUJITSU LIMITED, Kawasaki-shi, Kanagawa (JP)

(72) Inventor: Takashi Iijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 14/223,080

(22) Filed: Mar. 24, 2014

(65) Prior Publication Data

US 2014/0293557 A1   Oct. 2, 2014

(30) Foreign Application Priority Data

Mar. 27, 2013 (JP) .................................. 2013-067213

(51) Int. Cl.
*H04M 1/18* (2006.01)
*H04M 1/02* (2006.01)

(52) U.S. Cl.
CPC ............ *H04M 1/18* (2013.01); *H04M 1/0277* (2013.01)

(58) Field of Classification Search
CPC .............................. H04M 1/18; H04M 1/0277
See application file for complete search history.

(56) References Cited

U.S. PATENT DOCUMENTS

| 2004/0087333 | A1* | 5/2004 | Hutchison | H01H 13/70 455/550.1 |
| 2004/0102229 | A1* | 5/2004 | Hutchison | H01H 13/70 455/575.1 |
| 2008/0081679 | A1* | 4/2008 | Kawasaki | H04B 1/3888 455/575.8 |
| 2009/0323298 | A1* | 12/2009 | Nakao | H04M 1/0277 361/757 |
| 2010/0110653 | A1* | 5/2010 | Hisada | H04M 1/0216 361/810 |
| 2010/0113108 | A1* | 5/2010 | Murata | H04M 1/03 455/575.1 |
| 2013/0005163 | A1* | 1/2013 | Holste | H05K 3/3405 439/83 |
| 2013/0005409 | A1* | 1/2013 | Okamoto | H04M 1/0237 455/575.1 |
| 2013/0182379 | A1* | 7/2013 | Kim | H04M 1/0283 361/679.01 |
| 2013/0217451 | A1* | 8/2013 | Komiyama | H04M 1/021 455/575.8 |
| 2013/0314863 | A1* | 11/2013 | Tanaka | H04M 1/18 361/679.01 |

(Continued)

FOREIGN PATENT DOCUMENTS

JP   2011-248825 A   12/2011

*Primary Examiner* — Binh Tran
*Assistant Examiner* — Douglas Burtner
(74) *Attorney, Agent, or Firm* — Westerman, Hattori, Daniels & Adrian, LLP

(57) ABSTRACT

An housing of electronic device, includes a resin molded housing with an opening there through, a sheet metal positioned within the opening and a water proofing tape positioned on a side of the sheet metal, wherein a periphery of the sheet metal and an entirety of the water proofing tape are encased within the resin molded housing so as to seal the opening in a water tight manner, and, a front central portion of the sheet metal and a rear central portion of the sheet metal are exposed.

10 Claims, 8 Drawing Sheets

(56) References Cited

U.S. PATENT DOCUMENTS

| | | | | |
|---|---|---|---|---|
| 2014/0294217 A1* | 10/2014 | Yamaguchi | ........... | H04M 1/035 |
| | | | | 381/334 |
| 2015/0111622 A1* | 4/2015 | Kee | ...................... | H04B 1/3888 |
| | | | | 455/575.1 |
| 2015/0155614 A1* | 6/2015 | Youn | ................... | H04M 1/0249 |
| | | | | 343/702 |
| 2015/0295614 A1* | 10/2015 | Michino | ............... | G06F 1/1637 |
| | | | | 455/575.8 |
| 2017/0294932 A1* | 10/2017 | Kang | ................... | H04B 1/3833 |

\* cited by examiner

HOUSING OF ELECTRONIC DEVICE AND ELECTRONIC DEVICE

CROSS-REFERENCE TO RELATED APPLICATION

This application is based upon and claims the benefit of priority of the prior Japanese Patent Application No. 2013-067213, filed on Mar. 27, 2013, the entire contents of which are incorporated herein by reference.

FIELD

The embodiments discussed herein are related to a housing with charging terminals that is placed in a desktop holder and is charged and an electronic device having the housing.

BACKGROUND

Portable electronic devices usable outdoors generally have a built-in rechargeable battery. The charging of this rechargeable battery is performed indoors by connecting a power connector to the housing, or by placing the electronic device in a desktop holder for charging. FIG. 1A illustrates an example of a portable electronic device 10 that is charged by being placed in a desktop holder 1 for charging. The electronic device 10 is, for example, a cell-phone 10, and the electronic device and the cell-phone are hereinafter given the same sign 10.

The desktop holder 1 has a recess 2 that receives the lower end part 10L of the cell-phone 10. Holding protrusions 3 for locking the lower end part 10L of the cell-phone 10 inserted into the recess 2 and charging pins 4 are protruded into the recess 2. The holding protrusions 3 and the charging pins 4 are biased by springs (not shown) so as to protrude into the recess 2. Therefore, when the lower end part 10L of the cell-phone 10 is inserted into the recess 2, the holding protrusions 3 and the charging pins 4 are pressed by the lower end part 10L and are retracted from the recess 2 into the desktop holder 1. A connector 8 for supplying power from an AC adapter (not shown) to the charging pins 4 of the desktop holder 1 is connected to the back of the desktop holder 1.

The cell-phone 10 that is charged by inserting the lower end part 10L thereof into the desktop holder 1 is waterproof, and an elastic member for waterproofing is attached to a part that is sandwiched between a lower housing 11 and an upper housing 12 of the cell-phone 10 and that blocks intrusion of moisture and dust. The elastic member for waterproofing will be described later. The lower housing 11 of the cell-phone 10 is provided with a camera 5 and a fingerprint sensor 6, and charging terminals 21 are exposed on the lower end part 10L thereof. The camera 5 and the fingerprint sensor 6 are independently waterproofed.

When, in a portable electronic device, charging terminals are exposed on the lower end part of the electronic device, metal plates having a U-shaped cross-section are used as discussed in Japanese Laid-open Patent Publication No. 2011-248825. The metal plates having a U-shaped cross-section have an exposed portion exposed on the lower end part, a first extended portion perpendicular to the exposed portion, and a second extended portion adjacent to the first extended portion and parallel to the exposed portion. The second extended portion is connected to a charging circuit of the electronic device.

The charging terminals 21 in the example illustrated in FIG. 1A are provided in a charging terminal holder 20 that is a separate member from the lower housing 11, illustrated in FIGS. 1B and 1C. The charging terminals 21 are visible through openings 10W provided in the lower housing. The charging terminal holder 20 has an oval cylindrical main body 22. An O-ring 23 for waterproofing is attached around the side thereof. Two charging terminals 21 are exposed on the top thereof. Two connection terminals 25 for connection to a circuit board built in the cell-phone and two mounting holes 26 are provided on and in the bottom thereof. The two charging terminals 21 and the two connection terminals 25 are connected to each other inside the main body 22. Claws 27 are provided on the lower part of the side of the charging terminal holder 20 in the longitudinal direction. The claws 27 are for positioning of the charging terminal holder 20, and are not indispensable.

FIG. 2A illustrates an example of the structure of the lower end part of a circuit board 14 built in the cell-phone 10. At the lower end of the circuit board 14, two spring contacts 15 are mounted at positions corresponding to the connection terminals 25 illustrated in FIG. 1C. FIG. 2B is a side view illustrating the structure of the spring contacts 15 mounted on the circuit board 14.

FIG. 2C is an enlargement of a section of the lower part of the cell-phone 10 illustrated in FIG. 1A. Mounting pins 17 provided on a mount 16 mounted at the lower end of the circuit board 14 are inserted into mounting holes 26 provided in the bottom of the charging terminal holder 20, and the charging terminal holder 20 is thereby attached to the circuit board 14. In this state, the O-ring 23 for waterproofing attached to the side of the charging terminal holder 20 is in close contact with a frame member 13 inside the upper housing 12 so that moisture and dust do not intrude into the frame member 13. The charging terminals 21 on the top of the charging terminal holder 20 are connected by connection portions 28 inside the main body 22 to connection terminals 25 on the bottom of the charging terminal holder 20. The connection terminals 25 are connected by the spring contacts 15 to a circuit on the circuit board 14. In the electronic device having charging terminals in the comparative art, charging terminals have to be provided separately from the housing. This increases the number of components, increases the assembling man-hour for connecting the charging terminals to the circuit board inside the device, and therefore increases the cost. In addition, a space for mounting members for connecting the charging terminals exposed to the outside of the housing and the circuit board inside the device has to be left inside the housing, and it is difficult to reduce the thickness of the electronic device.

These arts are disclosed, for example, in Japanese Laid-open Patent Publication No. 2011-248825.

SUMMARY

According to an aspect of the invention, an housing of electronic device, includes a resin molded housing with an opening there through, a sheet metal positioned within the opening and a water proofing tape positioned on a side of the sheet metal, wherein a periphery of the sheet metal and an entirety of the water proofing tape are encased within the resin molded housing so as to seal the opening in a water tight manner, and, a front central portion of the sheet metal and a rear central portion of the sheet metal are exposed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present application will be described in detail through specific embodiments with reference to the drawings. In the embodiments described below, the electronic device 10 that is the subject of the present application will be described as a cell-phone 10. The same members as those of the cell-phone 10 described with reference to FIGS. 1A, 1B, and 2A to 2C are given the same signs. Sheet metals are given representative sign 30, and sheet metals of respective examples are individually given signs.

Figure 1A:
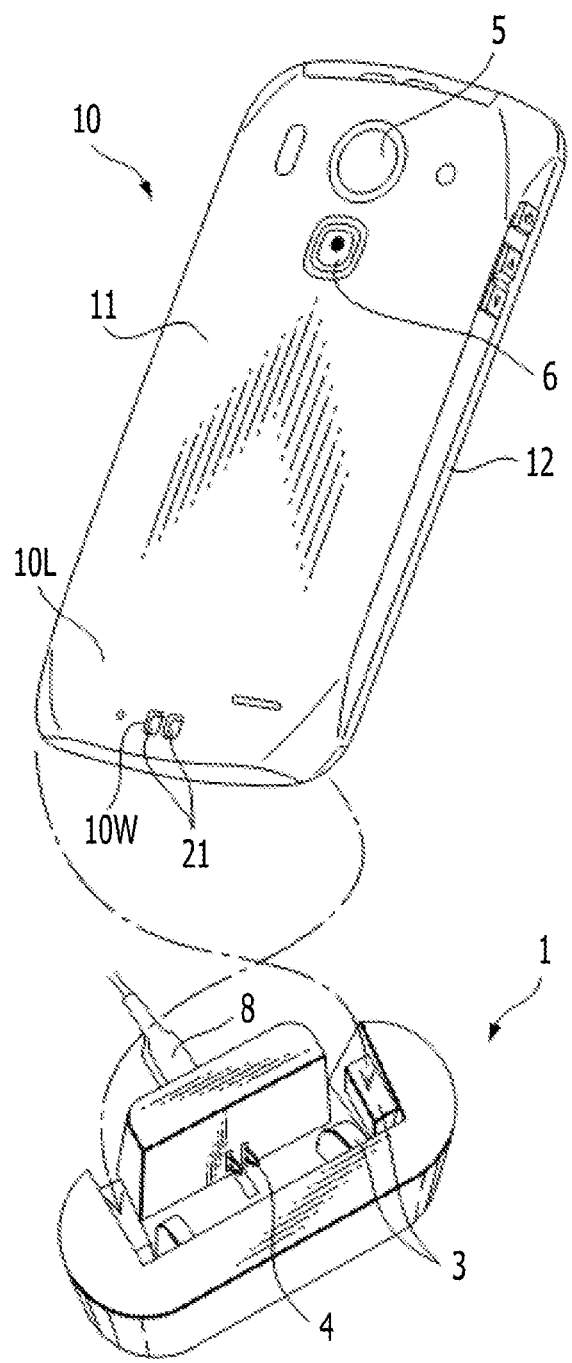
FIG. 1A is a perspective view illustrating a cell-phone that is an example of an electronic device that is the subject of the present application, and a desktop holder that charges the cell-phone.
Figure 1B:
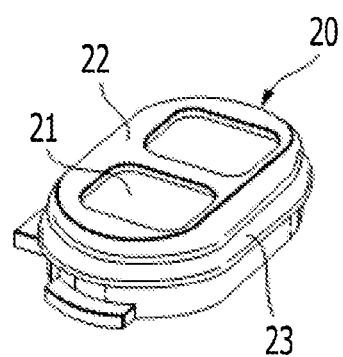
FIG. 1B is a perspective view of an example of a charging terminal holder embedded in the lower end part of the cell-phone illustrated in FIG. 1A, the view being taken from the top.
Figure 1C:
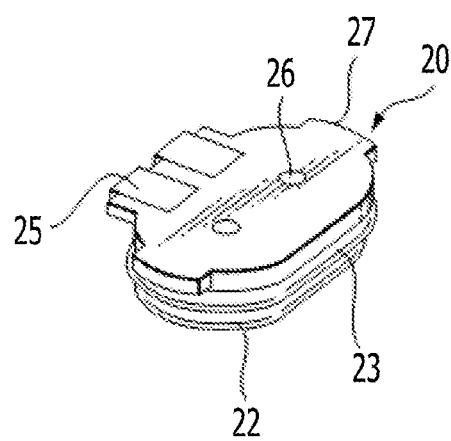
FIG. 1C is a perspective view of the charging terminal holder illustrated in FIG. 1B, the view being taken from the bottom.
Figure 2A:
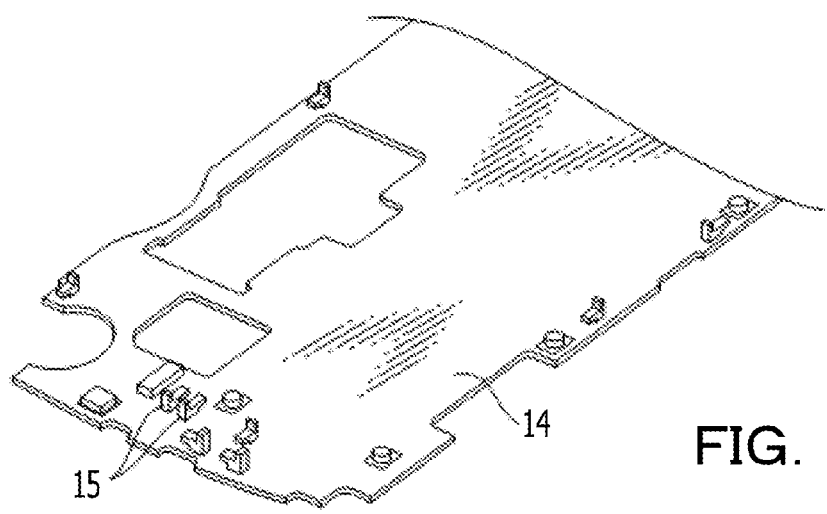
FIG. 2A is a partial perspective view illustrating the structure of the lower part of a circuit board built in the cell-phone illustrated in FIG. 1A.
Figure 2B:
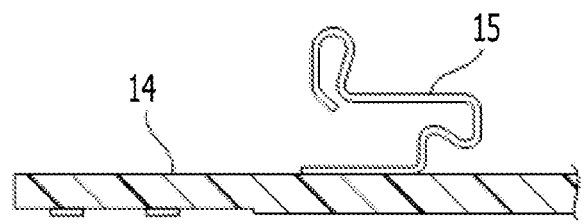
FIG. 2B is a partial enlarged sectional view of the vicinity of spring contacts of the circuit board illustrated in FIG. 2A.
Figure 2C:
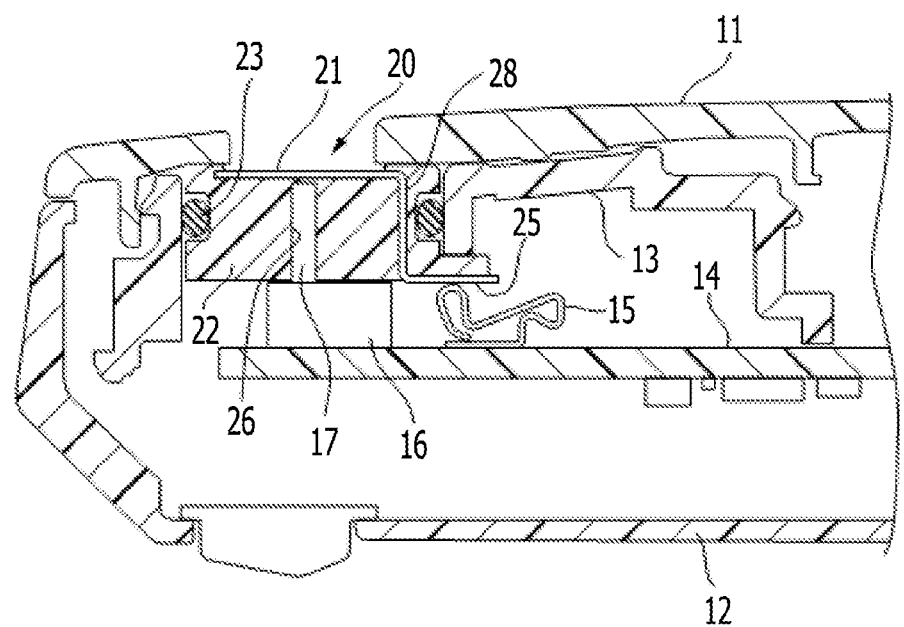
FIG. 2C is a partial enlarged sectional view of the lower end part of the cell-phone illustrated in FIG. 1A.
Figure 3A:
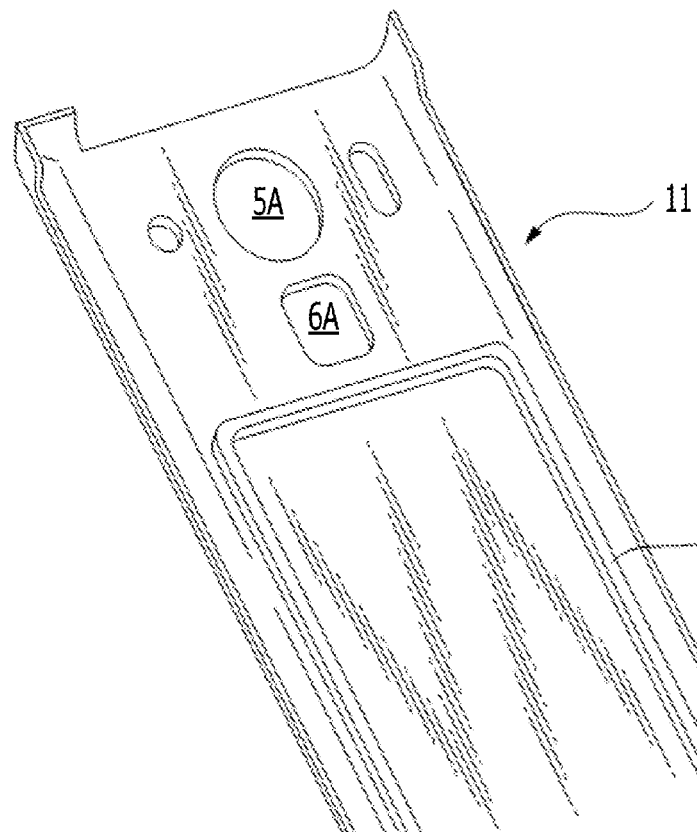
FIG. 3A is a perspective view of a lower housing of a cell-phone of an embodiment of an electronic device, the view being taken from the inner side.
Figure 3B:
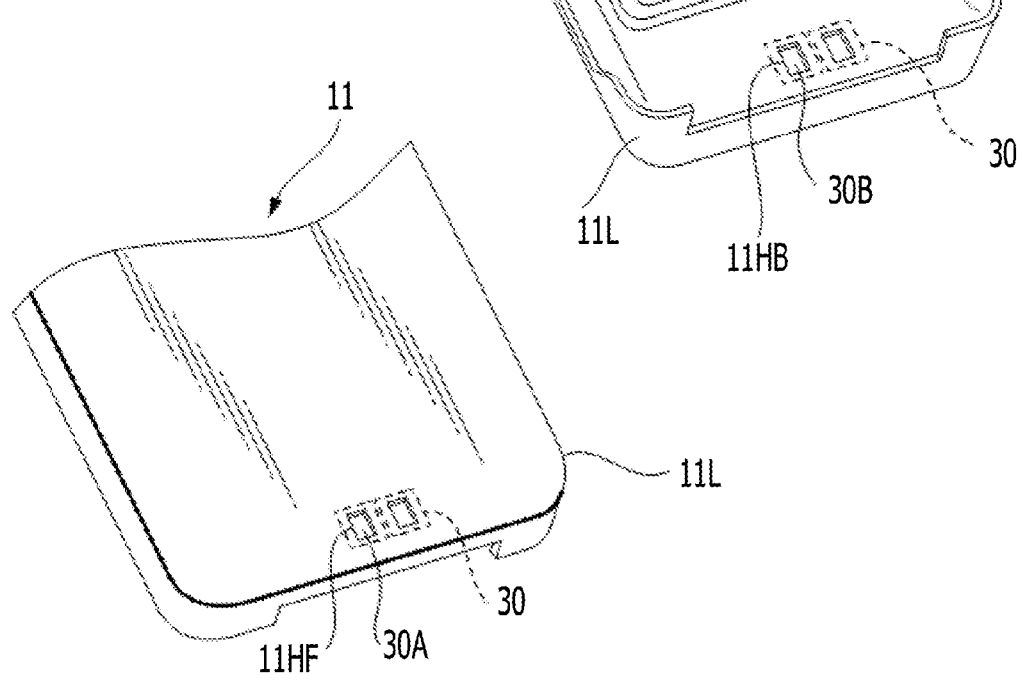
FIG. 3B is a partial perspective view of the lower end part of the lower housing illustrated in FIG. 3A, the view being taken from the back.

FIG. 3A is a view of a lower housing 11 of a cell-phone 10 of an embodiment of the present application, the view being taken from the inner side. FIG. 3B is a view only of a lower end part 11L of the lower housing 11 illustrated in FIG. 3A, the view being taken from the outer side. The lower housing 11 is provided with holes such as a hole 5A for a camera and a hole 6A for a fingerprint sensor. An elastic member 7 that shields internal components from moisture and dust is attached in a loop shape to the central part of the inner side of the lower housing 11. The elastic member 7 is a continuous body, and is generally made of rubbers. When the lower housing 11 is joined to an upper housing (not shown), the elastic member 7 is in close contact with a frame member (not shown) and suppresses intrusion of water and dust into the frame member.

Two sheet metals 30 to be described later are embedded in the central part of the lower end part 11L of the lower housing 11. Holes 11HF for charging terminals are provided in the outer surface over the sheet metals 30 embedded in the lower end part 11L, and holes 11HB for connection terminals are provided in the inner surface. The front surfaces 30A of the sheet metals 30 are exposed through the holes 11HF for charging terminals, and the back surfaces 30B of the sheet metals 30 are exposed through the holes 11HB for connection terminals.

Figure 4A:
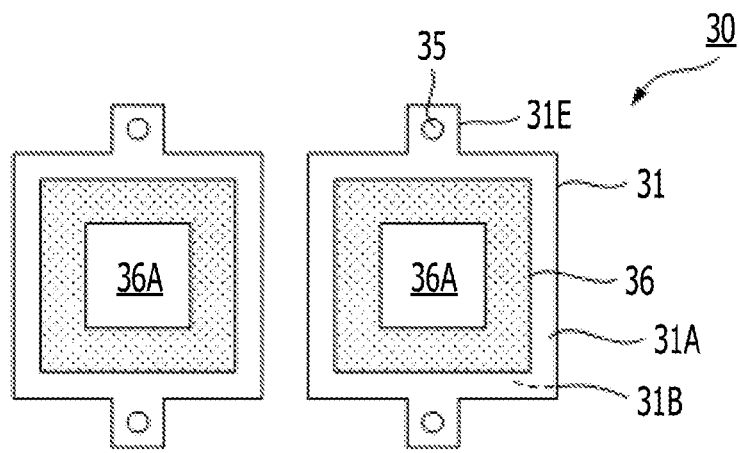
FIG. 4A is a plan view of a first embodiment of sheet metals embedded in the lower end part of the lower housing of the cell-phone illustrated in FIG. 3A.

FIG. 4A illustrates sheet metals 31 of a first embodiment, of the sheet metals 30 embedded in the central part of the lower end part 11L of the lower housing 11 of the cell-phone 10 illustrated in FIG. 3A. The sheet metals 31 of the first embodiment are rectangular. Mounting holes 35 are provided in extended portions 31E formed by extending parts of both ends. A heat activated tape 36 that is activated when heated and serves as a water stop member is stuck to a first surface 31A of each sheet metal 31. The heat activated tapes 36 have, in their central parts, openings 36A for exposing the sheet metals 31. Nothing is stuck to a second surface 31B. The sheet metals 31 of the first embodiment are embedded in a thick part of the lower housing 11 by insert molding at the time of molding of the lower housing 11. The process of molding the lower housing 11 by insert molding will be described later.

Figure 4B:
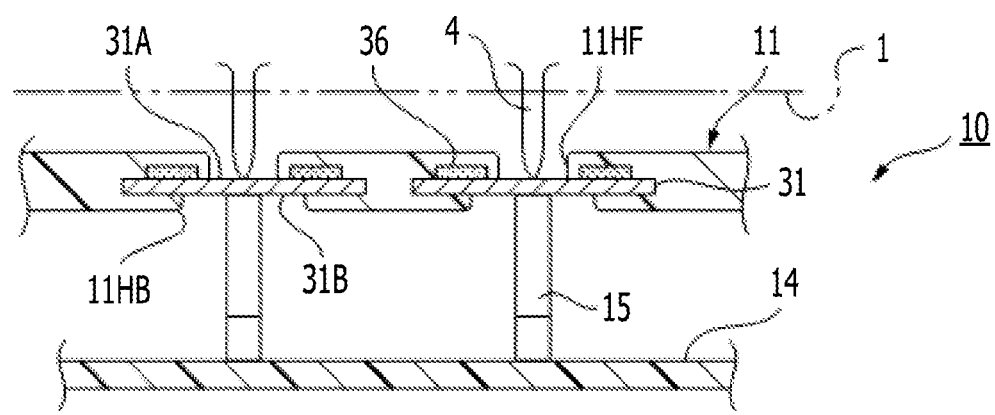
FIG. 4B is a partial enlarged sectional view illustrating connection from charging pins to a circuit board when an electronic device having a lower housing of an embodiment in which the sheet metals illustrated in FIG. 4A are embedded is placed in the desktop holder.

FIG. 4B illustrates a state where the two sheet metals 31 of the first embodiment illustrated in FIG. 4A are embedded in the lower housing 11. In addition, FIG. 4B illustrates connection from the charging pins 4 to the circuit board 14 when the cell-phone 10 having the lower housing 11 in which the sheet metals 31 of the first embodiment are embedded is placed in the desktop holder 1 illustrated in FIG. 1A. Holes 11HF for charging terminals are provided in the outer surface of part of the lower housing 11 in which the sheet metals 31 are embedded, and holes 11HB for connection terminals are provided in the inner surface thereof. The heat activated tapes 36 are located in parts of the lower housing 11 around the holes 11HF for charging terminals, and block intrusion of water and dust through the holes 11HF for charging terminals. The front surfaces 31A of the sheet metals 31 are exposed to the outside through the holes 11HF for charging terminals, and the back surfaces 31B of the sheet metals 31 are exposed to the inside through the holes 11HB for connection terminals.

In addition, in the cell-phone 10 having the lower housing 11 in which the sheet metals 31 of the first embodiment are embedded, spring contacts 15 mounted on a built-in circuit board 14 are in contact with the back surfaces 31B of the sheet metals 31 through the holes 11HB for connection terminals. When the cell-phone 10 having the lower housing 11 in which the sheet metals 31 of the first embodiment are embedded is placed in the desktop holder 1, the charging pins 4 of the desktop holder 1 are in contact with the front surfaces 31A of the sheet metals 31 through the holes 11HF for charging terminals.

Figure 4C:
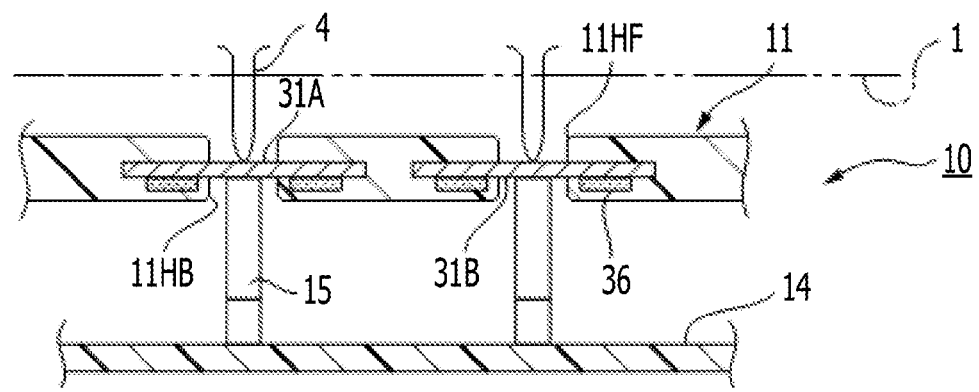
FIG. 4C is a partial enlarged sectional view illustrating connection from charging pins to a circuit board when an electronic device having a lower housing of an embodiment in which the sheet metals illustrated in FIG. 4A are embedded upside down is placed in the desktop holder.

FIG. 4C illustrates a state where the two sheet metals 31 of the first embodiment illustrated in FIG. 4A are embedded upside down in the lower housing 11. Therefore, the state illustrate in FIG. 4C is the same as the state illustrated in FIG. 4B except that the positions of the heat activated tapes 36 relative to the sheet metals 31 are around the holes 11HB for connection terminals. So, the same components are given the same reference signs, and the description thereof is omitted.

Figure 5A:
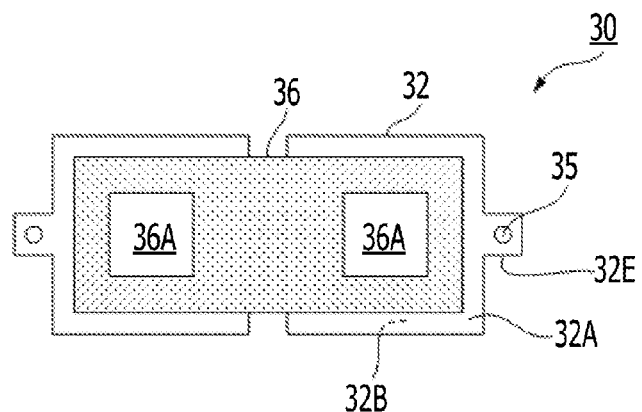
FIG. 5A is a plan view of a second embodiment of sheet metals embedded in the lower end part of the lower housing of the cell-phone illustrated in FIG. 3A.

FIG. 5A illustrates sheet metals 32 of a second embodiment, of the sheet metals 30 embedded in the central part of the lower end part 11L of the lower housing 11 of the cell-phone 10 illustrated in FIG. 3A. The sheet metals 32 of the second embodiment are also rectangular. Mounting holes 35 are provided in extended portions 32E formed by extending parts of end parts farthest from the adjacent sides. A heat activated tape 36 that is activated when heated and serves as a water stop member is stuck to first surfaces 32A of the sheet metals 32 across the two sheet metals 32, and nothing is stuck to second surfaces 32B. Openings 36A for exposing the sheet metals 32 are provided in parts of the heat activated tape 36 located on the two sheet metals 32. The sheet metals 32 of the second embodiment are also embedded in a thick part of the lower housing 11 by insert molding at the time of molding of the lower housing 11. The process of molding the lower housing 11 by insert molding will be described later.

Figure 5B:
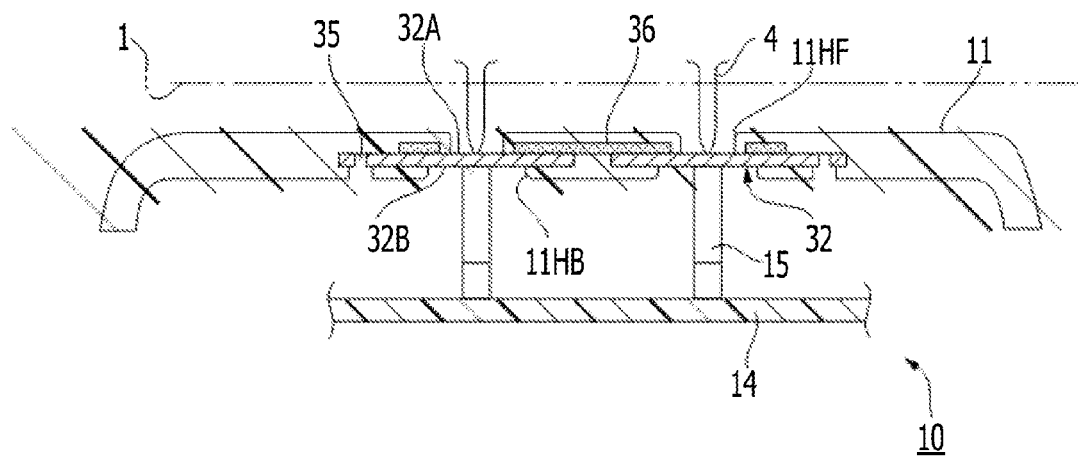
FIG. 5B is a partial enlarged sectional view illustrating connection from charging pins to a circuit board when an electronic device having a lower housing of an embodiment in which the sheet metals illustrated in FIG. 5A are embedded is placed in the desktop holder.

FIG. 5B illustrates a state where the two sheet metals 32 of the second embodiment illustrated in FIG. 5A are embedded in the lower housing 11. In addition, FIG. 5B illustrates connection from the charging pins 4 to the circuit board 14 when the cell-phone 10 having the lower housing 11 in which the sheet metals 32 of the second embodiment are embedded is placed in the desktop holder 1 illustrated in FIG. 1A. Holes 11HF for charging terminals are provided in the outer surface of part of the lower housing 11 in which the sheet metals 32 are embedded, and holes 11HB for connection terminals are provided in the inner surface thereof. The heat activated tape 36 is located in parts of the lower housing 11 around the holes 11HF for charging terminals, and blocks intrusion of water and dust through the holes 11HF for charging terminals. The front surfaces 32A of the sheet metals 32 are exposed to the outside through the holes 11HF for charging terminals, and the back surfaces 32B of the sheet metals 32 are exposed to the inside through the holes 11HB for connection terminals.

In addition, in the cell-phone 10 having the lower housing 11 in which the sheet metals 32 of the second embodiment are embedded, spring contacts 15 mounted on a built-in circuit board 14 are in contact with the back surfaces 32B of the sheet metals 32 through the holes 11HB for connection terminals. When the cell-phone 10 having the lower housing 11 in which the sheet metals 32 of the second embodiment are embedded is placed in the desktop holder 1, the charging pins 4 of the desktop holder 1 are in contact with the front surfaces 32A of the sheet metals 32 through the holes 11HF for charging terminals.

Figure 6A:
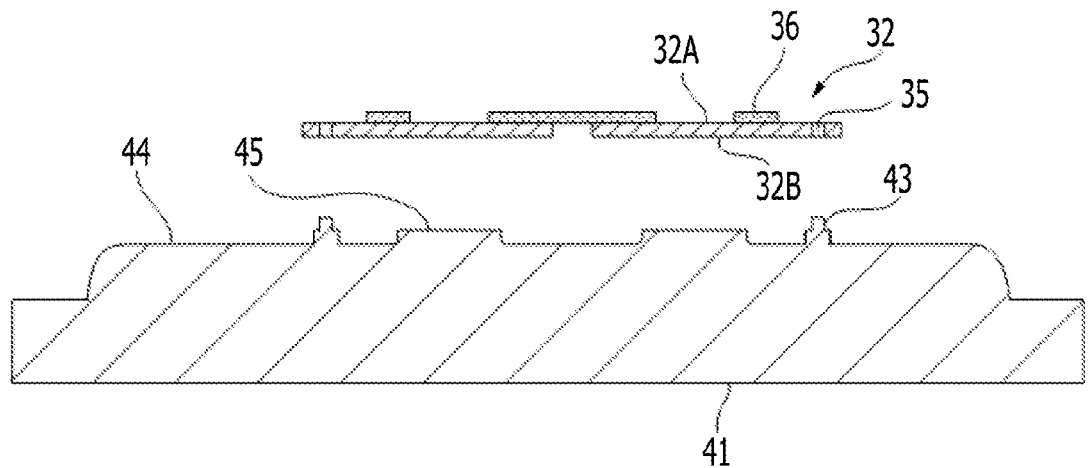
FIG. 6A is a sectional view illustrating a state where the sheet metals of the second embodiment illustrated in FIG. 5A are being attached to an insert male mold.

Here, with reference to FIGS. 6A and 6B, a description will be given of the process of embedding the sheet metals 32 of the second embodiment in the lower housing 11 by insert molding using an insert mold 40 when manufacturing the lower housing 11. FIG. 6A illustrates a state where the sheet metals 32 of the second embodiment illustrated in FIG. 5A are being attached to a male mold 41. The male mold 41 is provided with the same number of positioning protrusions 43 as the number of the mounting holes 35 provided in the sheet metals 32. The positioning protrusions 43 are inserted into the mounting holes 35 of the sheet metals 32. The male mold 41 has a core 44 for forming injected resin into the shape of the lower housing 11, and connection terminal forming protrusions 45. When the sheet metals 32 are attached to the positioning protrusions 43, the connection terminal forming protrusions 45 are in close contact with the back surfaces 32B of the sheet metals 32 and form holes 11HB for connection terminals.

Figure 6B:
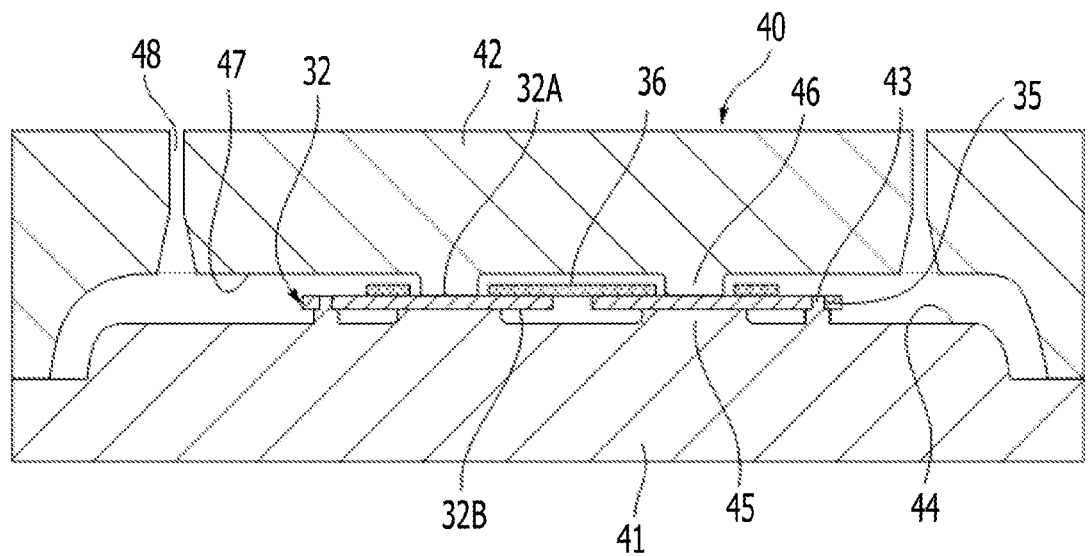
FIG. 6B is a sectional view illustrating a state where the sheet metals of the second embodiment illustrated in FIG. 5A are attached to an insert mold.

FIG. 6B illustrates a state where the sheet metals 32 of the second embodiment are attached to the male mold 41 illustrated in FIG. 6A, a female mold 42 is mounted on the male mold 41, and an insert mold 40 is formed. In FIG. 6B, the depiction of guide pins for alignment of the male mold 41 and the female mold 42 is omitted. The female mold 42 has, in the surface thereof facing the male mold 41, a cavity 47 for forming injected resin into the shape of the lower housing 11. The female mold 42 is provided with charging terminal forming protrusions 46. When the female mold 42 is mounted on the male mold 41, with the sheet metals 32 attached to the positioning protrusions 43 of the male mold 41, the charging terminal forming protrusions 46 are in close contact with the front side surfaces 32A of the sheet metals 32 and form holes 11HF for charging terminals.

The female mold 42 is further provided with a sprue 48 that is a channel for introducing molten resin into the cavity 47. The nozzle of an injector that injects molten resin is connected to the sprue 48, resin is injected through the sprue 48 into the cavity 47, and the resin flows in the insert mold 40 so as to enclose the sheet metals 32. After the resin has set, the female mold 42 is removed from the male mold 41. Thus, the lower housing 11 illustrated in FIG. 5B is formed.

Figure 7A:
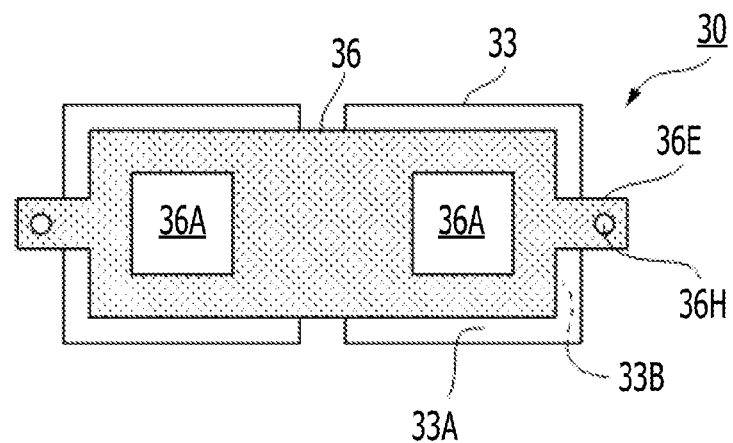
FIG. 7A is a plan view of a third embodiment of sheet metals embedded in the lower end part of the lower housing of the cell-phone illustrated in FIG. 3A.

FIG. 7A illustrates sheet metals 33 of a third embodiment, of the sheet metals 30 embedded in the central part of the lower end part 11L of the lower housing 11 of the cell-phone 10 illustrated in FIG. 3A. The sheet metals 33 of the third embodiment are rectangular. Unlike the sheet metals 31 and 32 of the first and second embodiments, the sheet metals 33 are not provided with extended portions. Instead, a heat activated tape 36 stuck on first surfaces 33A of the sheet metals 33 is formed across the two sheet metals 33, extended portions 36E are provided by extending both longitudinal ends, and mounting holes 36H are provided in the extended portions 36E. As with the above-described embodiments, nothing is stuck on second surfaces 33B of the sheet metals 33. Openings 36A for exposing the sheet metals 33 are provided in parts of the heat activated tape 36 located on the two sheet metals 33. The sheet metals 33 of the third embodiment are also embedded in a thick part of the lower housing 11 by insert molding at the time of molding of the lower housing 11.

Figure 7B:
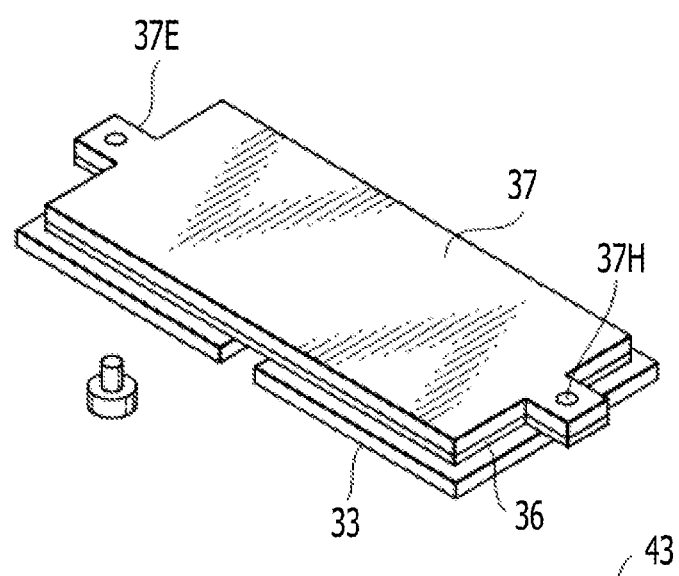
FIG. 7B is an assembled perspective view illustrating a state where the sheet metals of the third embodiment illustrated in FIG. 7A are being attached to positioning protrusions of the insert mold.

However, the two sheet metals 33 may not be properly attached to the positioning protrusions 43 of the male mold just by providing extended portions 36E at both longitudinal ends of the heat activated tape 36 stuck on the first surfaces 33A of the sheet metals 33, because the extended portions 36E are flexible. So, in the third embodiment, as illustrated in FIG. 7B, a sheet of release paper 37 having a predetermined stiffness is superimposed on the heat activated tape 36 before the heat activated tape 36 is attached to the male mold. The outer shape of the sheet of release paper 37 is the same as the outer shape of the heat activated tape 36, extended portions 37E are provided at both longitudinal ends, and mounting holes 37H are provided in the extended portions 37E. The mounting holes 37H are superimposed on the mounting holes 36H in the extended portions 36E of the heat activated tape 36.

Figure 7C:
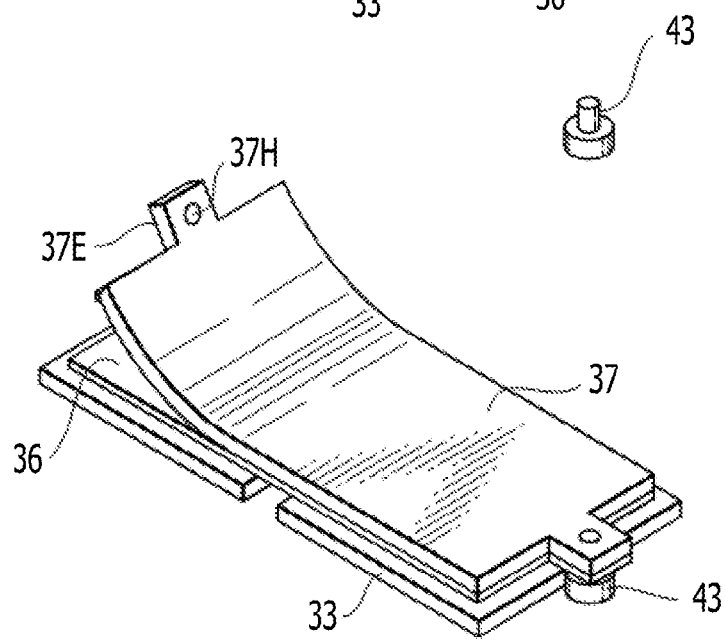
FIG. 7C is a perspective view illustrating a state where a sheet of release paper is being removed after the sheet metals of the third embodiment illustrated in FIG. 7B are attached to the positioning protrusions of the insert mold.

If a sheet of release paper 37 having a predetermined stiffness is superimposed on the heat activated tape 36 as described above, owing to the stiffness of the sheet of release paper 37, the heat activated tape 36 does not deform, and the sheet metals 33 may be attached to the positioning protrusions 43 using the mounting holes 37H of the sheet of release paper 37 as illustrated in FIG. 7B. After the sheet metals 33 are attached to the positioning protrusions 43 using the mounting holes 37H of the sheet of release paper 37, the sheet of release paper 37 is peeled from the heat activated tape 36 as illustrated in FIG. 7C. Here, a figure illustrating a state where the two sheet metals 33 of the third embodiment are embedded in the lower housing 11 is omitted.

Figure 8A:
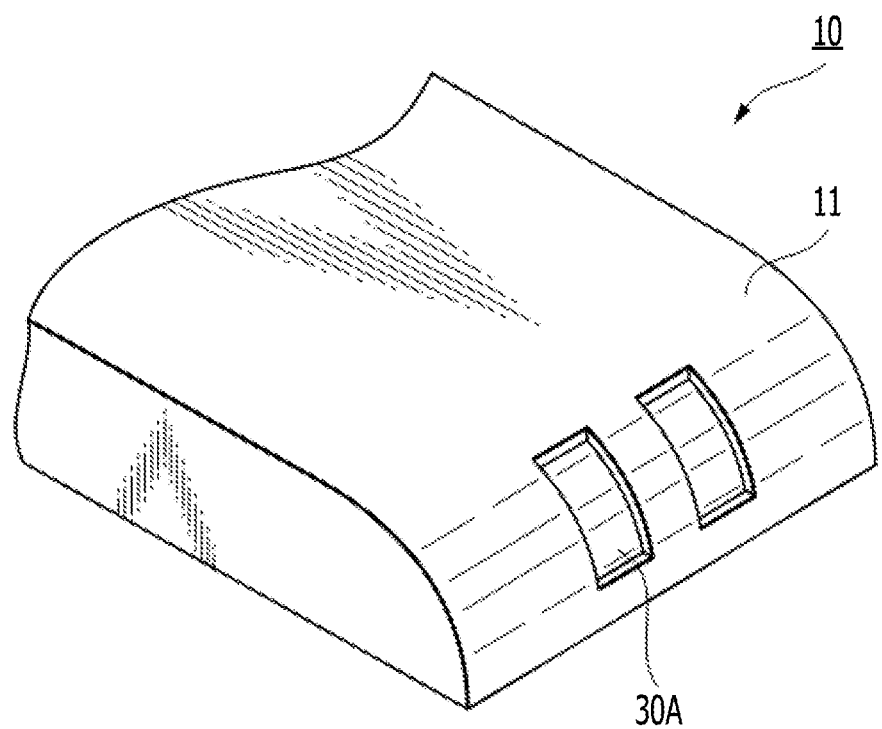
FIG. 8A is a partial enlarged perspective view of a lower housing of another embodiment of an electronic device, the view being taken from the outer side.
Figure 8B:
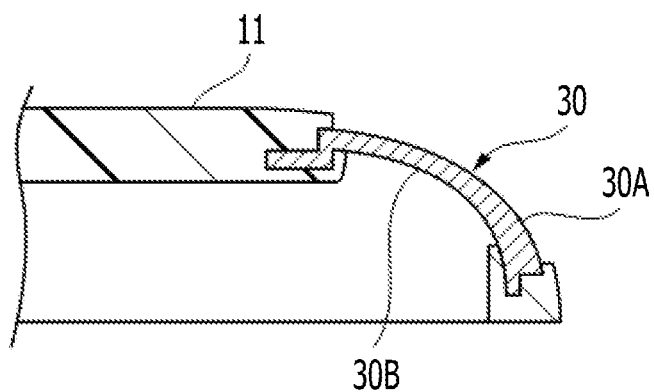
FIG. 8B is a sectional view of the lower end part of the lower housing illustrated in FIG. 8A.

In the above-described embodiments, the sheet metals 30 are all embedded in the flat surface of the lower housing 11. However, the location where the sheet metals 30 are embedded is not limited to the flat surface. FIG. 8A is a view of a lower housing 11 of another embodiment of the electronic device 10 that is the subject of the present application, the view being taken from the outer side. In this embodiment, the front surfaces 30A of the sheet metals are exposed on the curved surface of the lower housing 11. FIG. 8B illustrates a section of a part of the lower housing illustrated in FIG. 8A in which the sheet metals are embedded. As described above, charging terminals formed of sheet metals 30 may also be placed on the curved surface of the lower housing 11. The housing in which the sheet metals 30 are embedded is not limited to the lower housing 11, and may be the upper housing 12.

The present application has been described above in detail particularly in connection with preferred embodiments thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An housing of electronic device, comprising:
 a sheet metal on which a heat activated tape, with a first opening, is stuck; and
 a resin molded housing, with a second opening, formed so that at least one of a first side of the heat activated tape and a second side of the heat activated tape is covered with and contacting with the resin molded housing in thickness direction of the heat activated tape and that at least part of the sheet metal is exposed through the first opening of the heat activated tape and the second opening of the resin modeled housing, the first side of the heat activated tape being a side along an outer circumference of the heat activated tape, the second side of the heat activated tape being a side along an inner circumference of the first opening of the heat activated tape.

2. The housing according to claim 1, wherein the part of the sheet metal which is exposed is facing an exterior of the electronic device.

3. The housing according to claim 1, wherein the sheet metal includes tabs extending from the periphery, each of the tabs having a mold mounting opening therein.

4. The housing according to claim 1, wherein a second heat activated tape is, independently of the heat activated tape, stuck on a second sheet metal, and the second heat activated tape is provided with an opening that exposes the second sheet metal.

5. The housing according to claim 4, wherein the sheet metal and second sheet metal are each provided with a mold mounting hole,
 wherein at least one of the heat activated tape and second heat activated tape comprise a waterproofing tape, and the waterproofing tape is stuck across at least one of the sheet metal and the second sheet metal so that the sheet metal and the second sheet metal are arranged at a predetermined distance from each other, and
 wherein openings that expose the sheet metal and the second sheet metal are provided in parts of the waterproofing tape stuck to the sheet metal and the second sheet metal.

6. The housing according to claim 4, wherein the sheet metal and second sheet metal are embedded in the housing by insert molding.

7. An electronic device, comprising:
 a sheet metal on which a heat activated tape, with a first opening, is stuck and a second part on which the heat activated tape is not stuck; and
 a resin molded housing, with a second opening, formed so that at least one of a first side of the heat activated tape and a second side of the heat activated tape is covered with contacting with the resin molded housing in thickness direction of the heat activated tape and that at least part of the sheet metal is exposed through the first opening of the heat activated tape and the second opening of the resin modeled housing, the first side of the heat activated tape being a side along an outer circumference of the heat activated tape, the second side of the heat activated tape being a side along an inner circumference of the first opening of the heat activated tape.

8. The electronic device according to claim 7, further comprising:
 a circuit board within the housing having a spring contact mounted thereon;

the spring contact directly contacting the rear central portion of the sheet metal to provide electrical contact between the sheet metal and the circuit board.

9. The housing according to claim 1, wherein the heat activated tape is covered with and contacting with the resin molded housing entirely except for a surface sticking on the sheet metal.

10. The housing according to claim 1, wherein a heat of a resin, forming the resin molded housing, in molding process causes activation of the heat activated tape so that at least one of the first side and the second side of the heat activated tape is covered with and contacting with the resin molded housing.

\* \* \* \* \*